March 30, 1943.  A. A. SCHWARTZ  2,315,479
OVAL CUTTING MACHINE
Filed Nov. 9, 1940  2 Sheets-Sheet 1

INVENTOR
ARTHUR A. SCHWARTZ
BY
Bean, Brooks, Buckley & Bean.
ATTORNEYS

March 30, 1943.  A. A. SCHWARTZ  2,315,479
OVAL CUTTING MACHINE
Filed Nov. 9, 1940    2 Sheets-Sheet 2
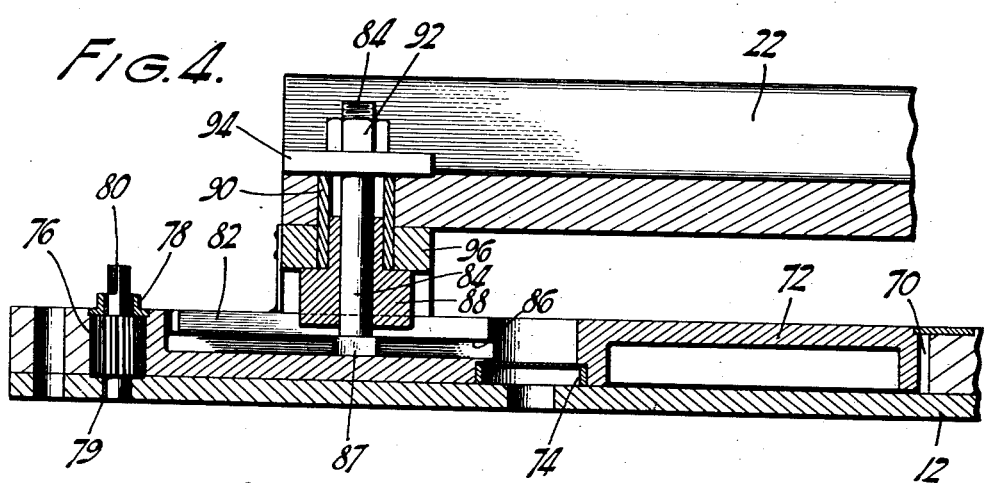
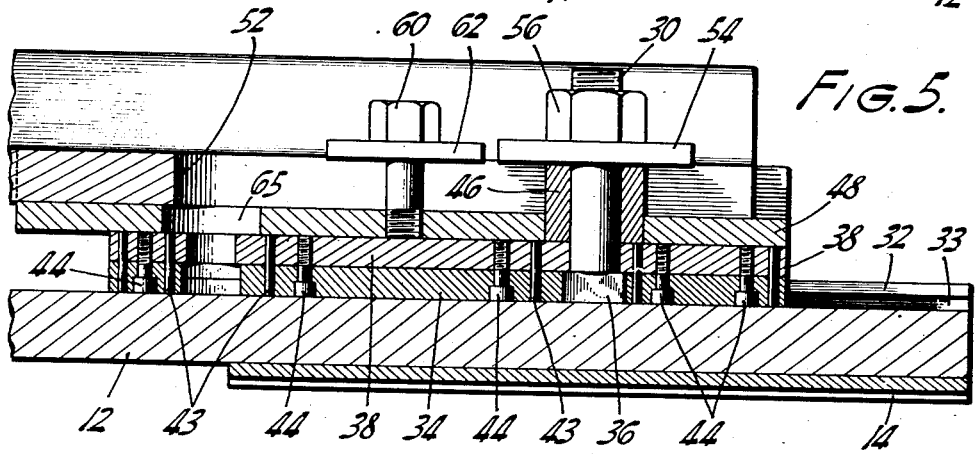
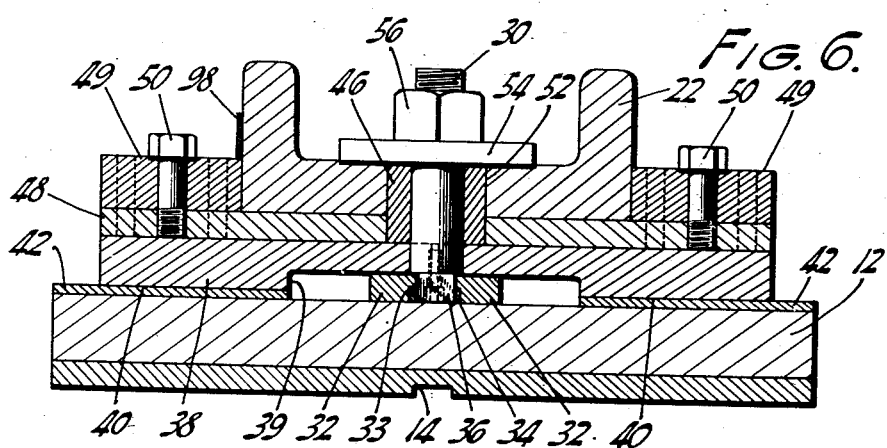
INVENTOR
ARTHUR A. SCHWARTZ
BY
Beau, Brooks, Buckley & Beau.
ATTORNEYS Patented Mar. 30, 1943

2,315,479

UNITED STATES PATENT OFFICE 2,315,479

OVAL CUTTING MACHINE

Arthur A. Schwartz, Buffalo, N. Y., assignor to Bell Aircraft Corporation, Buffalo, N. Y.

Application November 9, 1940, Serial No. 365,084

6 Claims. (Cl. 90—15)

This invention relates to automatic shop machine tools, and more particularly to an improved form of tool for shaping work pieces in accord with predetermined approximately elliptical patterns.

One of the objects of the invention is to provide an improved machine tool which is readily adjustable to shape the work in accord with any desired oval pattern. Another object of the invention is to provide an improved tool which is capable of attaining the above described object, and which is of rugged and simplified and otherwise improved structural form. Another object of the invention is to provide a machine tool of the character described which is adjustable to treat a variety of work piece shaping problems with improved facility and effectiveness. Other objects and advantages of the invention will appear from the specification hereinafter.

In the drawings:

Fig. 4 is a fragmentary vertical section taken substantially along line IV—IV of Fig. 1;

Fig. 5 is a fragmentary vertical section taken substantially along line V—V of Fig. 1; and Fig. 6 is a transverse vertical section taken substantially along line VI—VI of Fig. 1.

Figure 3:
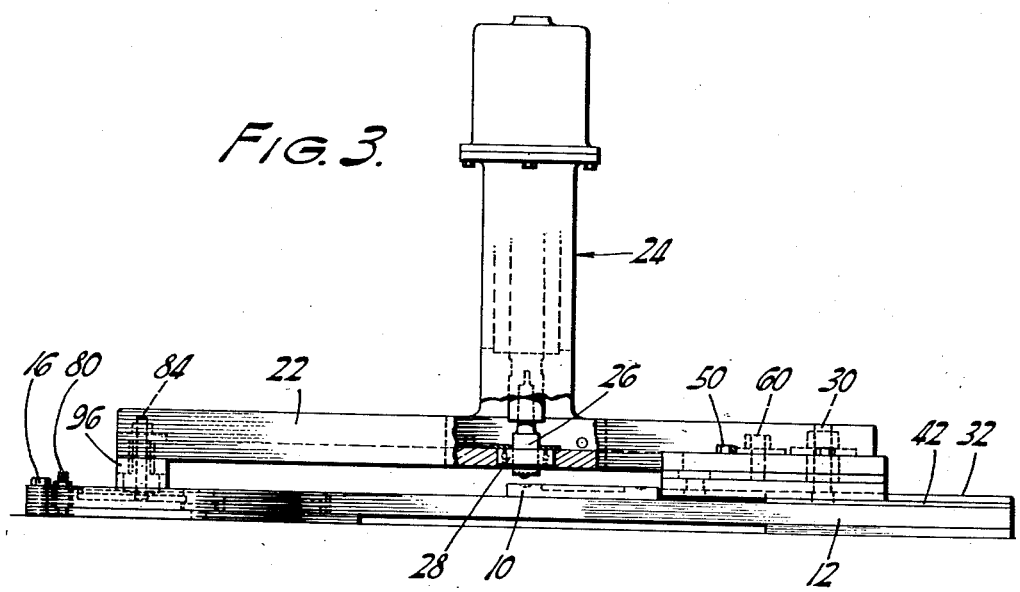
Fig. 3 is a side elevation of the tool of Fig. 1.

The drawings illustrate the invention in the form of a machine tool adapted to mill approximately elliptical contours on stock to be formed into tool dies or finished structural parts, or the like; and by way of illustration the tool is illustrated in Fig. 3 as being arranged to cut a recess of elliptical plan form into the surface of a block 10 of metal for subsequent use as a forming die in connection with the pressing of stiffening deformations in sheet metal stock. However, it will be understood that the tool is adapted to cut any desired form of oval contour in any kind of work piece for any other purpose.

The tool comprises generally a base plate 12 which is grooved in its under surface at 14 for engagement with a complementary upstanding key extending from the base plate supporting surface. A lag screw 16 is provided at one end of the base plate for bolting the latter down upon the supporting surface, and thus the base plate is firmly anchored against lateral movement under operating conditions. A cross head 22 is mounted above the base plate and intermediately of its ends is a milling head indicated generally by the numeral 24. The milling head 24 comprises essentially a suitable motor and driving spindle means operatively associated with a milling cutter indicated by the numeral 26. It will be understood that the mounting of the cutter and the driving motor and spindle mechanism within the milling head is in accord with present milling practice, and that any suitable motor control means will be arranged in operative association with the milling cutter driving motor for operating the latter. As illustrated in Fig. 3, the cutter 26 will preferably be rotatably supported relative to the cross head 22 by means of a suitable bearing 28.

The cross head 22 is pivotally connected at one of its ends to the base plate 12 by means of a bolt 30 in such manner as to be both pivotable thereon and slidable longitudinally of the base plate. For this purpose the base plate 12 is provided with an integral split rail 32 disposed centrally of the base plate and extending longitudinally thereof. The opposite side portions of the split rail 32 are internally recessed at 33 and provide therebetween an open way which slidably accommodates a key bar 34 of inverted T-shaped sectional form into which is fitted the lower headed end 36 of the bolt 30. The head 36 is elongated in directions longitudinally of the cross head, as illustrated in Fig. 5 so as to engage under a cover plate 38 which is centrally recessed as at 39 in its lower surface portion so as to span the split rail 32 and to slidably bear at its outer side portions 40 against corresponding wearing plates 42 which are mounted upon adjacent portions of the bed plate 12. The key bar 34 is pinned to the cover plate 38 by means of a plurality of pins 43 and screws 44. Thus, the bolt 30 and the cover plate 38 are slidable longitudinally of the bed plate 12, and are guided in such movement by the key bar 34 which is slidable within the split rail 32.

A bushing 46 is mounted upon the bolt 30 and an adjustment plate 48 is mounted adjacent the under surface of the cross head 22 by means of side rails 49 which are clamped to the adjustment plate 48 by means of screws 50. The side rails 49 slidably embrace adjacent side portions of the cross head member 22, and the adjustment plate 48 is centrally bored so as to rotatably receive the bolt and bushing unit 30—46 therethrough.

Figure 1:
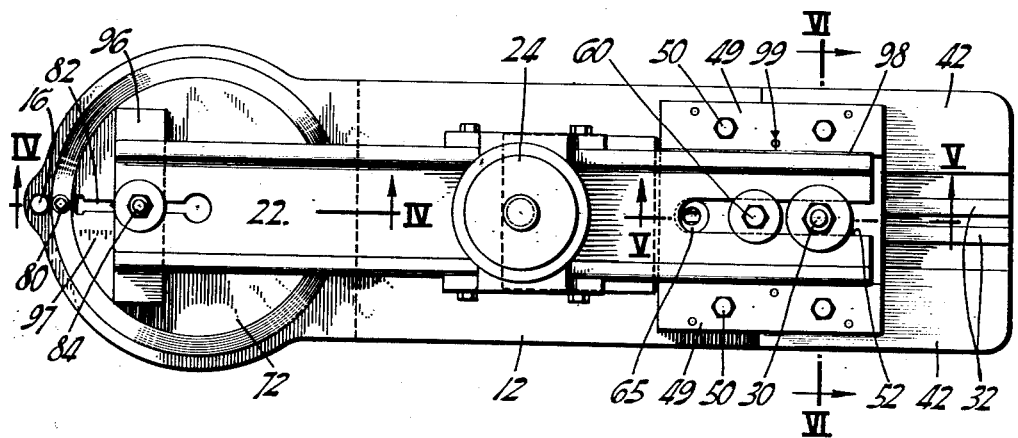
Fig. 1 is a plan of a machine tool of the invention.

As illustrated in Fig. 1, the cross head member 22 is longitudinally slotted at 52 in the region of its engagement with the bolt and bushing unit 30—46, and a washer 54 is arranged upon the bolt 30 under a nut 56 which is screw-threaded upon the upper end of the bolt. The bushing 46 and the washer 54 are so dimensioned and arranged that the nut 56 may be tightened so as to force the washer to bear against the bushing 46 and to cause the cover plate 38 to be clamped between the bolt head 36 and the bushing 46 without clamping the cross head 22 and the adjustment plate 48 to the cover plate 38. Thus, the cover plate 38 remains free to slide longitudinally of the base plate upon the wearing plates 42, and the cross head member 22 and the adjustment plate 48 are free to rotate together about the vertical axis of the bolt 30 against the upper surface of the cover plate 38.

Also, unless otherwise restrained, the cross head member 22 is longitudinally slidable against the upper surface of the adjustment plate 48 between the side rails 49. An adjustment locking screw 60 is connected in screwthreaded relation at its lower end into the adjustment plate 48 and is provided with a washer 62 under its headed upper end which spans the slotted portion 52 of the cross head member 22 and bears down upon opposite side portions of the cross head member for detachably locking the latter in various longitudinal adjusted positions relative to the plate 48. Thus, the longitudinal disposition of the pivot bolt 30 relative to the cross head 22 may be readily shifted as required for purposes as will be explained hereinafter. As illustrated in Figs. 1 and 5, the cover plate 38, the key bar 34, and the adjustment plate 48 may be apertured as at 65 in such manner as to receive the bolt and bushing unit 30—46 at an alternative position on the mechanism in connection with adaptation of the device to the shaping of variously dimensioned contours.

The base plate 12 is formed at its opposite end with a well 70 into which is fitted a gear wheel 72. The wheel 72 is rotatably mounted upon the base plate 12 by means of a central bearing 74 so as to be freely rotatable upon the base plate. Adjacent a peripheral portion of the gear wheel 72 a pinion 76 is rotatably mounted upon the base plate 12 in mesh with the gear 72 by means of suitable bearings 78 and 79 embracing opposite end portions of the pinion shaft 80 which is squared at its upper extending end portion for engagement with a crank device (not shown). The gear wheel 72 is radially slotted as at 82 through an upper surface portion thereof to receive in slidable relation therein the shank of a bolt 84 extending downwardly from the adjacent end portion of the cross head member 22. The slot 82 in the gear wheel 72 is under cut at opposite side portions thereof as indicated at 86 to receive the lower enlarged head 87 of the bolt 84.

A key 88 is mounted upon the bolt 84 and is so formed at its lower enlarged end as to engage the slot 82 to prevent relative rotation between the key 88 and the gear wheel 72. Also, the key 88 is so formed as to be vertically supported at its lower end against the gear wheel 72. A collar 90 is mounted about the bolt 84 and is arranged to bear at its lower end against a reduced shouldered portion of the key 88 and to be inserted at its upper end through a suitable aperture in the cross head member 22. The key member 88 and the bushing 90 are so dimensioned vertically as to provide that when the nut 92 of the bolt 84 is screwthreaded down upon a washer 94 arranged adjacent the upper end of the bushing 90, the key member 88 and the bushing 90 and washer 94 are clamped together as a unit as a rigid integral extension from the gear wheel 72 about which the cross head 22 is free to rotate during rotation of the gear wheel 72; and the gear wheel and the cross head members are connected together by the bolt 84 against accidental disengagement from operative relation. A cross head supporting block 96 is fixed to the under surface of the cross head member 22 in the region of the bolt 84, and is arranged to span the lower enlarged portion of the key 88 so as to avoid interference with rotation of the latter relative to the cross head member. The block 96 is arranged to be freely slidable against the upper surface of the gear wheel 72.

It will be noted that the bolt and bushing unit 84—90 thus provides a pivotal connection between the cross head member 22 and the gear wheel 72 at a position eccentric of the axis of rotation of the gear wheel 72, and that the cross head member 22 is mounted at its opposite end upon the base plate 12 by means of a combination oscillation and longitudinal slide connection device in the form of the bolt 30. Thus, rotation of the gear wheel 72, as by operation of a crank device controlling the pinion 76, will cause the adjacent end portion of the cross head to rotate in a circular path about the axis of rotation of the gear wheel 72, and the opposite end of the cross head member will simultaneously be correspondingly reciprocated longitudinally of the base plate while oscillating about the axis of the bolt 30. As illustrated diagrammatically by Fig. 2, such operation of the mechanism will cause the milling cutter 26 to move through an approximately elliptical path; and thus, the cutter is arranged to shape the work piece associated therewith in accord with a corresponding pattern.

To adjust the tool, for example, to increase or decrease the dimension of the major axis of the oval contour to be provided, the bolt 84 is correspondingly shifted radially of the gear wheel 72 within the slotted portion 82 thereof to provide the desired longitudinal throw of the cross head member during each cycle of gear wheel rotation. A calibrated scale 97 is marked upon the gear wheel 72 for registry with a pointer mounted adjacent an end face of the block 96 to assist in making the desired adjustments. The bolt 84 is loosened and the block 96 rotated about the bolt 84 and relative to the cross head 22 to a position wherein it extends longitudinally of the cross head, thus bringing the pointer into registry with the scale 97.

Figure 2:
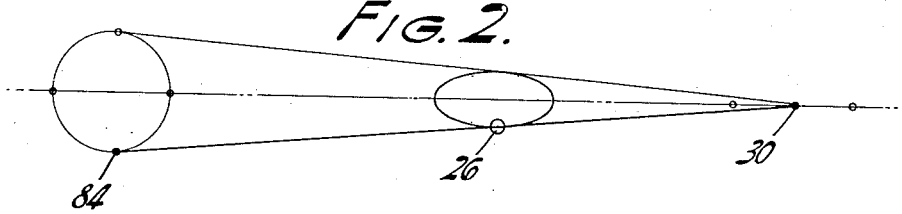
Fig. 2 is a diagram of an operating cycle thereof.

In order to vary the dimension of the minor axis of the oval contour to be provided the longitudinal position of the bolt 30 relative to the milling cutter 26 is correspondingly adjusted by shifting the adjustment plate 48 relative to the cross head 22 upon loosening of the screw 60; whereby the short axis of the elliptical contour of Fig. 2 will be correspondingly lengthened or shortened, as desired. A scale 98 is provided upon the cross head 22 for registry with an index marker 99 on the adjacent side bar 49 to assist in making desired adjustments of the ratio of the minor axis to the major axis of the elliptical contour to be provided.

It will be understood that in lieu of the cutter 26 illustrated and described herein, any other suitable form of shaping tool may be employed in conjunction with the machine of the invention to provide any desired type of stock shaping operation, as will be understood by those versed in the machine tool art.

Thus it will be understood that a simplified and improved form of universally adjustable oval contouring mechanism is provided, and although only one form of the invention has been shown and described in detail, it will be apparent to those skilled in the art that the invention is not so limited but that various changes may be made therein without departing from the spirit of the invention or the scope of the appended claims.

What is claimed is:

1. An oval contouring machine tool comprising a base, a wheel rotatably mounted upon said base, said base having a fixed slide way portion formed thereon directed toward the axis of rotation of said wheel, a key bar slidably mounted within said way for reciprocative sliding movement toward and away from said wheel, a cover plate fixed to said key bar for sliding movement therewith, said cover plate having opposite side portions straddling said way and slidably bearing against said base at opposite sides thereof, a bolt having an enlarged head portion inset within said key bar below said cover plate and having a reduced shank portion extending through said cover plate and therebeyond, a cross head pivotally mounted at one of its ends upon said wheel by means of a pivotal connection device disposed eccentrically of the axis of rotation of said wheel and pivotally mounted at its opposite end upon said bolt extending shank portion, means for varying the degree of eccentricity of disposition of said pivotal connection device relative to the axis of rotation of said wheel, and means for varying the distance between said cross head-wheel pivotal connection and said cross head-bolt shank connection.

2. An oval contouring machine tool comprising a base, a wheel rotatably mounted upon said base, said base having a fixed slide way portion formed thereon directed toward the axis of rotation of said wheel, a key bar slidably mounted within said way for reciprocative sliding movement toward and away from said wheel, a cover plate fixed to said key bar for sliding movement therewith, said cover plate having opposite side portions straddling said way and slidably bearing against said base at opposite sides thereof, a bolt having an enlarged head portion inset within said key bar below said cover plate and having a reduced shank portion extending through said cover plate and therebeyond, an adjustment plate mounted upon said extending bolt shank portion for free rotation thereon relative to said cover plate, a cross head pivotally mounted at one of its ends upon said wheel by means of a pivotal connection device disposed eccentrically of the axis of rotation of said wheel and pivotally mounted at its opposite end upon said bolt extending shank portion, means for varying the degree of eccentricity of disposition of said pivotal connection device relative to the axis of rotation of said wheel, and means for varying the distance between said cross head-wheel pivotal connection and said cross head-bolt shank connection comprising means for clamping said cross head and said adjustment plate together in various positions of longitudinally extending adjustment.

3. A machine tool comprising a base plate, an elongate cross head mounted thereon, a stock shaping tool arranged for rotation on an axis perpendicular to said elongate cross head and medially thereof, said axis of rotation being fixed with respect to said cross head, crank means mounted upon said base plate and pivotally engaging an end of said cross head for moving the same in a circular path upon rotation of the crank means, means for adjusting the radius of said circular path by shifting the pivotal connection between said cross head and said crank means, means adjacent the other end of said cross head mounted for longitudinal sliding movement on said base plate, a pivot carried by said slide and a slot in said cross head for engagement with said pivot, and locking means for securing said pivot at various positions in said slot for varying the effective length of said cross head by varying the distance between its pivotal connection with the crank and its securement to said pivot.

4. A machine tool comprising a base plate, an elongate cross head mounted thereon, a stock shaping tool carried by said cross head and arranged for rotation on an axis perpendicular to said elongate cross head and medially thereof, crank means mounted upon said base plate and pivotally engaging an end of said cross head for moving the same in a circular path upon rotation of the crank means, means for adjusting the radius of said circular path by shifting the pivotal connection between said cross head and said crank means, means adjacent the other end of said cross head mounted for longitudinal sliding movement on said base plate, a pivot carried by said slide and a slot in said cross head for engagement with said pivot, and locking means for securing said pivot at various positions in said slot for varying the effective length of said cross head by varying the distance between its pivotal connection with the crank and its securement to said pivot.

5. A machine tool comprising a base plate, an elongate cross head mounted thereon, a stock shaping tool arranged for rotation on an axis perpendicular to said elongate cross head and medially thereof, said axis of rotation being fixed with respect to said cross head, crank means mounted upon said base plate and pivotally engaging an end of said cross head for moving the same in a circular path upon rotation of the crank means, means for adjusting the radius of said circular path by shifting the pivotal connection between said cross head and said crank means, means adjacent the other end of said cross head mounted for longitudinal sliding movement on said base plate, a pivot carried by said slide and pivotally engaging said cross head and said slide, and adjustable means for securing said pivot at various positions lengthwise of said cross head for varying the distance between the pivotal connection between the crank and the cross head and the pivotal connection between the cross head and the slide.

6. A machine tool comprising a base plate, an elongate cross head mounted thereon, a stock shaping tool carried by said cross head and arranged for rotation on an axis perpendicular to said elongate cross head and medially thereof, crank means mounted upon said base plate and pivotally engaging an end of said cross head for moving the same in a circular path upon rotation of the crank means, means for adjusting the radius of said circular path by shifting the pivotal connection between said cross head and said crank means, means adjacent the other end of said cross head mounted for longitudinal sliding movement on said base plate, a pivot carried by said slide and pivotally engaging said cross head and said slide, and adjustable means for securing said pivot at various positions lengthwise of said cross head for varying the effective length of said cross head by varying the distance between the pivotal connection between the crank and the cross head and the pivotal connection between the cross head and the slide.

ARTHUR A. SCHWARTZ.